United States Patent [19]

Richardson

[11] 4,193,669
[45] Mar. 18, 1980

[54] LIQUID CRYSTAL DEVICE FOR DIRECT DISPLAY OF ANALOG INFORMATION

[75] Inventor: Kenneth J. Richardson, Hudson, Ohio

[73] Assignee: Crystaloid Electronics Company, Stow, Ohio

[21] Appl. No.: 811,308

[22] Filed: Jun. 29, 1977

[51] Int. Cl.² ............................................. G02F 1/13
[52] U.S. Cl. ...................... 350/334; 350/336
[58] Field of Search ........................ 350/332, 336, 334

[56] References Cited

U.S. PATENT DOCUMENTS

| | | | |
|---|---|---|---|
| 3,774,195 | 11/1973 | Schulthess | 350/332 X |
| 3,944,330 | 3/1976 | Tsunoda et al. | 350/336 |
| 3,979,743 | 9/1976 | Moore | 350/336 X |

Primary Examiner—Edward S. Bauer
Attorney, Agent, or Firm—Hamilton, Renner & Kenner

[57] ABSTRACT

A liquid crystal device for direct display of analog information in images and patterns includes a layer of liquid crystal material sandwiched between a front and a back transparent plate. Transparent conducting films are applied to selected portions of the sides of both front and back transparent plates adjacent to the liquid material. A resistor network is provided electrically continuous with at least one of the transparent conducting films for impressing a voltage gradient transversely across the transparent conducting films so as to permit the selective, incremental reorientation of the liquid crystal material into the desired images and patterns.

9 Claims, 4 Drawing Figures

LIQUID CRYSTAL DEVICE FOR DIRECT DISPLAY OF ANALOG INFORMATION

BACKGROUND OF THE INVENTION

The present invention relates generally to liquid crystal displays. More specifically, this invention relates to a liquid crystal display in which analog information may be presented in other than alphanumeric manner and the interfacing by which the display is controlled is greatly minimized or eliminated.

As is well known, liquid crystal displays are electrically controlled devices utilizing the optical properties of liquid crystal materials to display desired patterns with only ambient light. Most commercial liquid crystal displays, and all of the so called "light-shutter" type liquid crystal displays discussed hereinafter, employ liquid crystal materials having a twisted nematic molecular orientation in the absence of an electric field. Such displays utilize principally one of two basic mechanisms by which light passing therethrough is controlled. In "field-effect" cells the presence of an electric field changes the direction of the liquid crystal material's optic axis. In "scattering" cells the presence of an electric field results in either intense light scattering due to a disruption in the ordered, unenergized molecular structure ("dynamic scattering") or an intense light focusing due to an ordering of the unordered, unenergized molecular structure ("quiescent scattering"). As a result of greater power requirements and slower response time of scattering cells, field-effect cells are greatly preferred in nearly all present day applications.

Presently nearly all liquid crystal displays are utilized to form fixed format, alphanumeric patterns. These displays are digital in nature, having a plurality of physically and electrically discrete, separately addressed, pattern segments. Such patterns require multiple-lead interfacing with generally costly, complex and physically large driving networks in order to effectuate the desired characters.

Perhaps the best known example of alphanumeric liquid crystal displays are those of the field-effect, light-shutter type in which a layer of nematic liquid crystal material is sandwiched between transparent parallel plates. A 90° twist is induced in the nematic liquid crystal material by rubbing the plates at right angles to each other. Polarizers are placed adjacent to the outer surface of both plates such that when an electric field of sufficient potential is impressed across transparent conducting films applied to the inner surfaces of both plates, the nematic structure will untwist and the display will change from a light transmitting to an opaque medium or vice versa, depending upon the orientation of the two polarizers, thereby producing the aforesaid light-shutter effect. Typically the front plate conducting film is constructed with a plurality of physically and electrically separate conducting regions which, when appropriately, selectively energized, leave other regions unaffected so as to produce the desired letter or numeral.

Although some field-effect cells have attempted to display images or symbols other than letters or numerals, such liquid crystal displays have without exception required driving networks to appropriately control what quickly becomes a phenomenal number of separate conducting regions. Moreover, the greatly increased complexity of these networks over those associated with conventional alphanumeric display patterns has resulted in costly display controls frequently too large for most applications.

In much the same manner, the less desirable "scattering" type cells have also been utilized to form alphanumeric patterns. I am aware of only one instance in which general images or symbols other than letters or numerals have been formed with "scattering" type cells. In an article entitled "A Electronically Scanned Analog Liquid Crystal Display" published in Volume 9 *Applied Optics*, on pages 1323-1329 (June, 1970), the author, R. A. Soref, disclosed a technique for use with "scattering" type liquid crystal cells in which voltage gradients are induced transversely across the transparent conducting films so that the desired patterns can be formed. Although this technique does not require the use of the conventional driving networks previously noted, nevertheless driving equipment of a differeing type, including at least two voltage waveform generators external to the display, are required to effectuate even the simplest of patterns. The quantity of voltage generators, as well as the complexity of the voltage waveforms required, increases with the complexity of the desired pattern, likely resulting in an even more costly, complex, and a physically large display than needed for field-effect liquid crystal displays having similar patterns.

SUMMARY OF THE INVENTION

It is, therefore, an object of the invention to provide a liquid crystal device for direct display of analog information in images and patterns of other than an alphanumeric character.

It is another object of the invention to provide a liquid crystal device for direct display of analog information, as above, in which the need for external driving and/or controlling circuitry is mimimized or eliminated.

It is still another object of the invention to provide a liquid crystal device for direct display of analog information, as above, in which analog information may be directly displayed without the need for individually, selectively energizing separate conducting regions on the front transparent plate of the device.

It is yet another object of the invention to provide a liquid crystal device for the direct display of analog information, as above, in which the analog information may be directly displayed by including in at least one of the transparent conducting films at least two physically separate, distinct segments and impressing a voltage gradient transversly across such segments.

It is a further object of the invention to provide a liquid crystal device for direct display of analog information, as above, in which the aforesaid voltage gradient is produced by a resistor network.

It is still a further object of the invention to provide a liquid crystal device for direct display of analog information, as above, in which the resistor network is integrally formed with the transparent conducting film and is electrically continuous with all of the transparent conducting film segments.

It is yet a further object of the invention to provide a liquid crystal device for direct display of analog information, as above, in which the ratio of resistances within the resistor network may be either linear or non-linear such that any non-linear signal or information may be offset thereby and a direct and linear display of such information effectuated.

It is an additional object of the invention to provide a liquid crystal device for direct display of analog information, as above, in which the only required input to the device is the information signal to be displayed, the power required to operate the device being supplied by such information signal.

These and other objects and advantages of the present invention over existing prior art forms will become more apparent and fully understood from the following description in conjunction with the accompanying drawings.

In general, a device embodying the concept of the present invention includes a liquid crystal device for direct display of analog information in images and patterns. The device includes a layer of liquid crystal material sandwiched between a front and a back transparent plates. Transparent conducting means are applied to selected portions of the sides of both front and back transparent plate adjacent to the liquid material. Means are provided electrically continuous with at least one of the transparent conducting means for impressing a voltage gradient transversely across the transparent conducting means so as to permit the selective, incremental reorientation of the liquid crystal material into the desired images and patterns.

DESCRIPTION OF THE PREFERRED EMBODIMENTS

Figure 1:
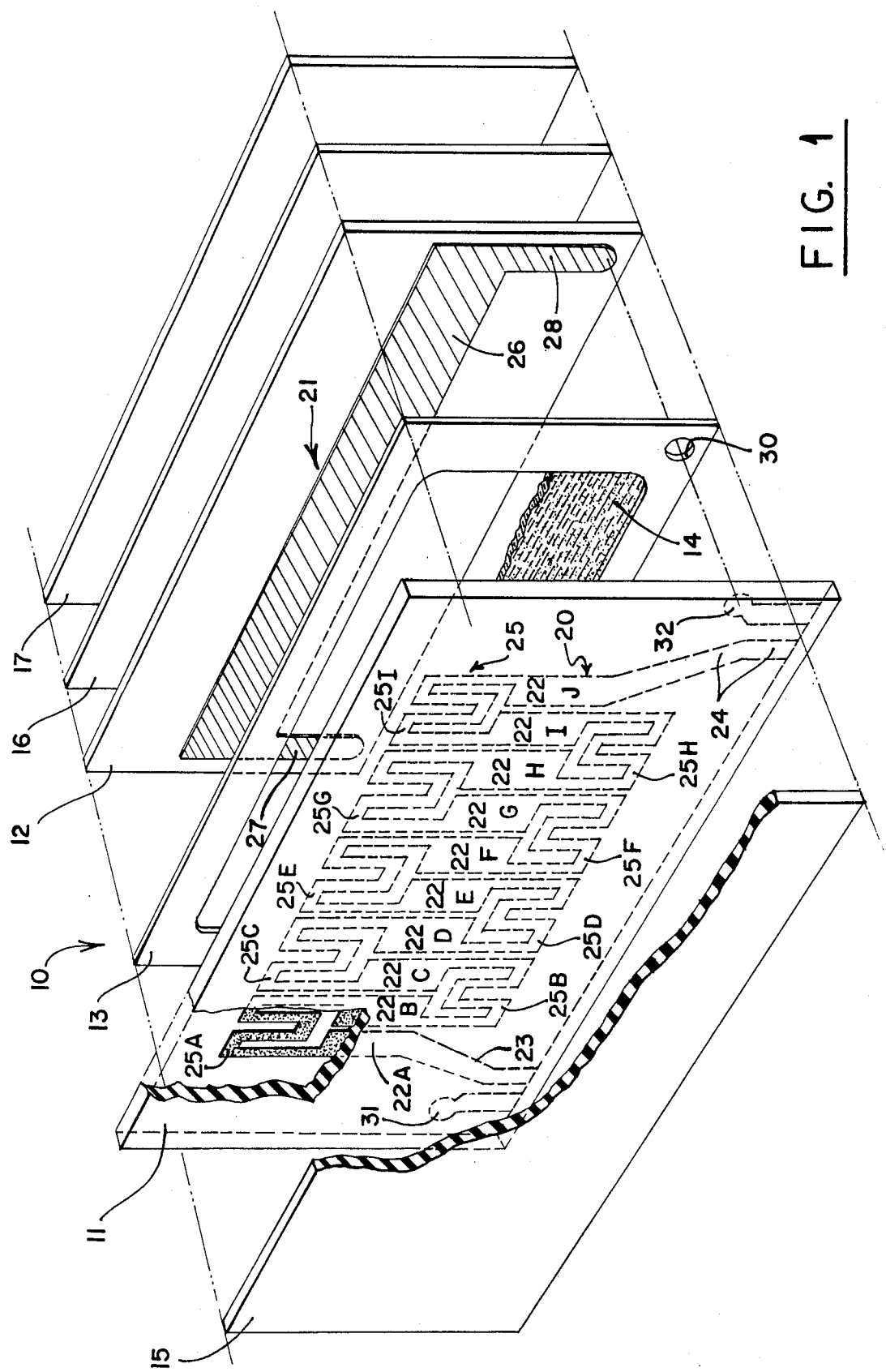
FIG. 1 is an exploded, perspective view of a liquid crystal display embodying the concept of the present invention and depicting particularly a three terminal, linear, equal-value resistor network.

Referring now to FIG. 1 of the drawings, a liquid crystal device for direct display of analog information is illustrated generally by the numeral 10. In this particular embodiment the liquid device 10 includes front and back transparent plates 11 and 12 respectively, made of an electrically non-conducting material such as glass or the like. Plates 11 and 12 are separated by gasket 13 which together with plates 11 and 12 collectively define the narrow chamber for encapsulating a thin film of liquid crystal material 14. Although liquid crystal material 14 is preferably of twisted nematic molecular orientation, it should be noted that the present invention is suitable for use with liquid crystal material having any type of molecular orientation. Futhermore, although it must again be understood that the concept of the present invention is not limited thereto, in the event that the present invention is to be embodied within a "light-shutter" type of liquid crystal display cell, conventional front and back polarizers 15 and 16, respectively, may be applied by any suitable means such as transparent epoxy to the sides of plates 11 and 12, respectively, opposite that constraining liquid crystal material 14, hereinafter referred to as the "outer side". Similarly, in the event that the display is to be viewed with ambient lighting passing into the display from the front, a reflector 17 which forward scatters the polarized light without depolarizing the same may be applied to the back side of the back polarizer 16.

Figure 3:
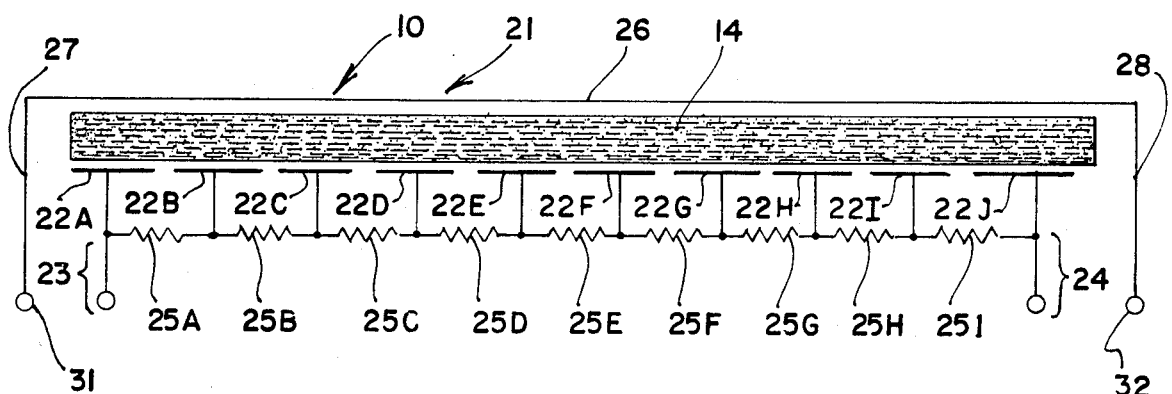
FIG. 3 is a schematic diagram of the liquid crystal display illustrated in FIG. 1.

As shown in FIG. 1, and schematically depicted in FIG. 3, patterns of transparent conducting material such as tin oxide or indium oxide are formed on or applied to the side of both front and back transparent plates adjacent to liquid crystal material 14, hereinafter referred to as the "inner sides", by any of numerous conventional means such as photoresist etching, sputtering, or the like and are indicated generally by the numerals 20 and 21, respectively. Transparent conducting material 20 is formed into a plurality of physically discrete, rectangular segments indicated generally by the numeral 22 and specifically as 22A through 22J. The exact quantity of segments 22 may be varied as desired, being limited primarily by the voltage range of the external voltage signals with which liquid crystal device 10 is designed to operate and secondarily by the threshold voltage of liquid crystal material 14. The longitudinally outermost of these rectangular segments (22A and 22J) are connected through conducting strips 23, 24 extending to the bottom edge of plate 11 to an external voltage signal (not shown) discussed hereinafter. Front transparent plate 11 extends beneath the remaining portions of the liquid crystal device 10 so that a suitable electrical connector can engage the lower portion of plate 11 to connect conducting strips 23, 24 and other conducting strips to be indicated hereinafter to the various external voltage signals, which may be either AC or DC, hereinafter described in more detail.

A linear resistor network, indicated generally by the numeral 25, may also be formed out of transparent conducting material 20. A resistor (e.g., 25A) is interposed between each two segments, (e.g., 22A and 22B) resulting in nine resistors 25A through 25I. Each resistor 25A through 25I preferrably follows a stylized serpentine path. Not only does such a design permit greater resistance values due to the greater length and narrower width of transparent conducting material 20 between each segment (although as will be explained hereinafter the absolute value of each resistor is not of primary significance) but also permits greater heat dissipation which can in turn substantially improve the cold weather operation of the device. However, as will be emphasized hereinafter, any desired patterns of display segments and resistors are permissible.

Transparent conducting material 21 is formed by similar techniques into a generally rectangular conducting back plate 26 having at least one, but permissibly two conducting strips 27, 28 for connection to the external voltage signal (not shown) as discussed hereinafter. Regardless of the segment pattern 22 utilized it should be noted that the pattern location of conducting back plate 26 should generally correspond to that of the entire segment pattern on front plate 11 so that only the liquid crystal material 14 between segments 22 and conducting back plate 26 will ever be exposed to an electric field; in no event should conducting back plate 26 align with any portion of resistor network 25 when plates 11 and 12 are bonded to opposite sides of gasket 13. In order to facilitate external connection with a single connector as previously described, holes 30 may be made in gasket 13 and filled with an electrically conducting epoxy material or the like so as to permit electrical connection between back plate conducting strips 27, 28 and conducting strips 31, 32 respectively.

Having described the construction of liquid crystal device 10, its operation as a liquid crystal device for direct display of analog information may now be detailed. Referring particularly to FIG. 3, operation of liquid crystal device 10 may be best understood by the following example.

Assume one is desirous of displaying the value of an analog signal such as the voltage from a conventional motor vehicle fuel tank indicator in which a nine volt potential represents a full tank and a zero volt potential represents an empty tank. A constant potential of nine volts is first impressed across conducting strips 23 and 24. The nine (9) equal-value resistors 25 will act as an equal voltage divider network, providing a nine volt potential on segment 22A, an eight volt potential on segment 22B, and so on until a zero volt potential is reached on segment 22J.

Next, the analog signal from the fuel tank indicator is connected to conducting back plate 26 through conducting strips 31 and/or 32. Merely for purposes of the present discussion, assume that the liquid crystal material 14 utilized has a threshold potential of one volt (i.e., when at least a one volt potential difference is impressed between a segment 22 and conducting back plate 26 that segment 22 will turn either "on" or "off" with respect to the remaining unenergized portions of display depending on the orientation of polarizers 15 and 16). When the tank is full and a nine volt potential is impressed on conducting back plate 26 it therefor should be readily apparent that only segment 22A will have less than a one volt potential difference between it and conducting back plate 26. Thus, segment 22A, which in this state may be referred to as the "null segment," will behave optically opposite that of all other segments 22. As the voltage from the fuel tank decreases, the "null segment" will move steadily toward segment 22J in discrete, one volt increments. Of course, in the event that the potential on conducting back plate 26 falls outside the potential impressed between conducting strips 23 and 24, all segments will be either "on" or "off" (i.e., there will be no "null segment") as all segments will be either above or below the threshold voltage.

Several factors should now become readily apparent to one skilled in the art. First, the absolute value of each resistor in the network is immaterial; only its relative value (or ratio) to each other resistor in the network is of any consequence, as it is this relationship which determines the potential division between segments and their corresponding optical response characteristics. Thus, notwithstanding great variations in resistances of transparent conducting material from display to display, as the absolute value of each resistor is immaterial, it should also be clear highly accurate and precise analog signal responding liquid crystal displays can be effectuated by merely accurately and precisely controlling the surface area of each resistor with respect to each other resistor in the network. Moreover, as discussed further hereinafter, displays can be manufactured at minimal costs to appropriately respond to an endless variety of analog input signals—be they linear or non-linear. Finally, the power dissipated by the resistor network, by appropriate design, may be utilized to significantly extend the lowest permissible operating temperature of liquid crystal device 10.

The second factor which should now be clear to the skilled artisan actually concerns the manner in which potentials are applied to segments 22 and conducting back plate 26. As the potential applied across conducting strips 23 and 24 ($V_{23-24}$ hereinafter) decreases, the "width" of the "null segment" will increase, all else being equal. In the example above, if $V_{23-24}$ is halved (to 4.5 volts) the "null segment" will consist of two (2) segments 22[(specifically, where the conducting back plate 26 potential ($V_{BP}$ hereinafter) is nine volts, both segments 22A and 22B will "null")]. Taking this observation in a broader context leads to the important point that involves recognition of the fact liquid crystal device 10 is, electrically speaking, what is known in the art as a three-port device, i.e., it has three terminals for external connection. Thus, there are at least three permutations of voltage-potential applications that are of interest in this embodiment: where $V_{23-24}$ is fixed and $V_{BP}$ is variable (illustrated hereinabove); where $V_{23-24}$ is variable and $V_{BP}$ is fixed; and where both $V_{23-24}$ and $V_{BP}$ are variable, either independently or in some related manner. Of course, by appropriate design of resistor network 22 liquid crystal device 10 may be made to have almost any number of terminals (i.e., be a "N-port" device) for acceptance of a similar number of analog signals. Here again the skilled artisan would find all such variations and modifications highly useful in producing liquid crystal devices suitable for direct response to almost any highly complex analog signal one is desirous of displaying and should therefore be taken to be within the spirit of the present invention.

A third factor which should now be plainly evident involves the formation of physically discrete, rectangular segments 22 out of transparent conducting material 20. Where transparent conducting material 20 formed into a single continuous plane, impressing a continuous voltage gradient transversely across such plane would result in areas of liquid crystal material 14 so close to its threshold potential that optically non-definitive regions would exist. A separation of transparent conducting material 20 into physically distinct segments 22 substantially eliminates these so-called "fringe-effect" regions, providing a highly defined interface between optically opposite areas of liquid crystal device 10.

Figure 2:
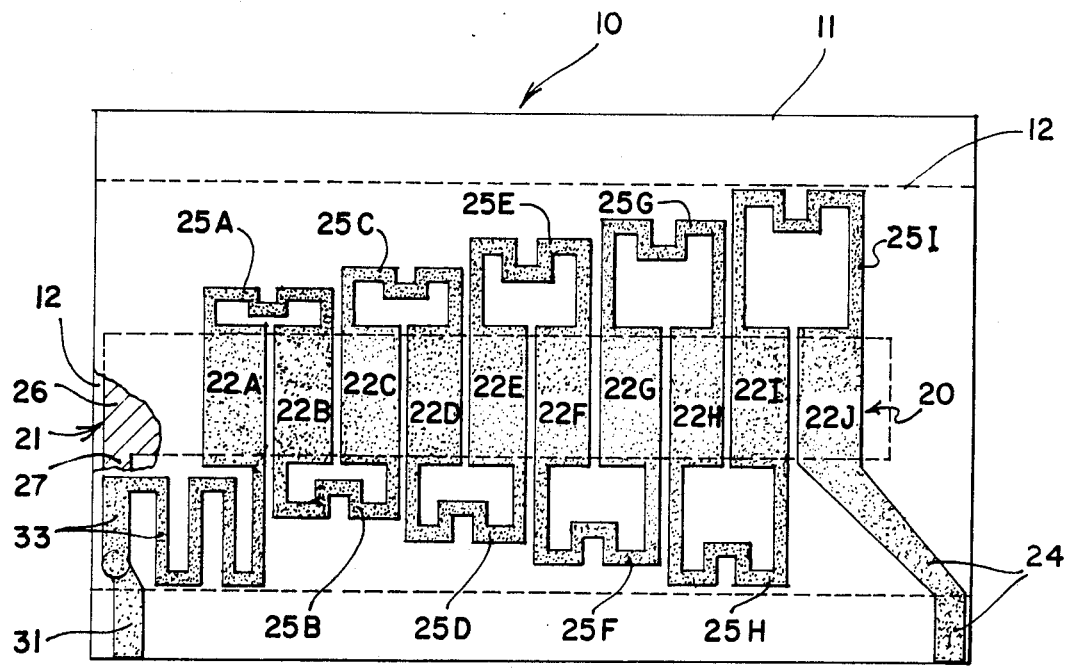
FIG. 2 is an elevational view of another embodiment of the liquid crystal display according to the present invention depicting particularly a two terminal, non-linear, unequal-value resistor network.

An exemplary and useful modification suggested in conjunction with the second factor hereinabove involves the case in which $V_{23-24}$ and $V_{BP}$ are both variable but in a related manner. Referring to FIGS. 1 and 2, conducting strips 31, 32 are connected with conducting strips 23, 24 respectively, through two resistors (not shown) which may be either external to liquid crystal device 10 or formed from transparent conducting material 20 in a manner similar to resistors 25. If both these resistors have equal resistances (regardless of what that may be) the potential applied to conducting back plate 26 will always be one half the potential applied across conducting strips 23, 24 (i.e., $V_{BP}=(\frac{1}{2})V_{23-24}$).

The desired analog input signal is applied across conducting strips 23, 24. Because of the equal-value resistor network, when the analog input signal is high in potential a "null segment" will occur in the center display segment. Thus, a liquid crystal device 10 operating in this manner should preferably have an odd number of segments where it is desired that at least one segment be energized for all possible analog input signal potentials. As the potential of the analog input signal decreases, the "width" of the "null segment" will expand outwardly, simultaneously toward segments 22A and 22J in a manner similar to that of an opening cat's eyelids. Varying the ratio of resistances of the two resistors between conducting strips 31, 32 and conducting strips 23, 24, respectively, will shift the initial "null segment" to the right or left depending on which resistor has the greater (or conversely smaller) resistance.

Turning to FIG. 2, illustrated therein is a second embodiment of the present invention, differing from the embodiment depicted in FIG. 1 in only two respects: First, this embodiment incorporates a non-linear resistor network in which the relative value of each resistor increases from segments 25A to 25I (i.e., $R_{25A} > R_{25B} > R_{25C} \ldots > R_{25I}$). The second variance involves the conversion of the three-port device of FIG. 1 into a two-port device by the elimination of conducting strip 23 and inclusion of another resistor 33 in the pattern of transparent conducting material 20, connected between segment 22A and conducting strip 31. Conducting strip 32 (the electrical equivalent to conducting strip 31) has also been eliminated.

Figure 4:
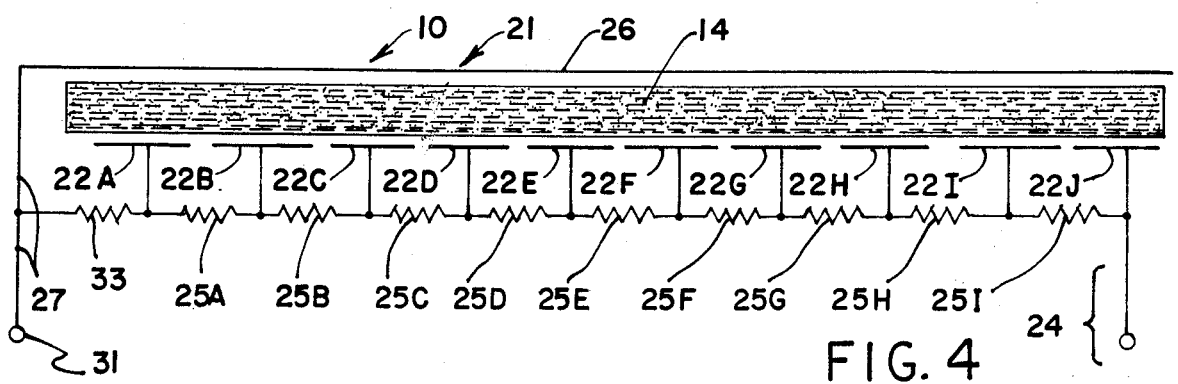
FIG. 4 is a schematic diagram of the liquid crystal display illustrated in FIG. 2.

The operation of this embodiment is best understood by reference to the electrical schematic diagram in FIG. 4. Merely for purposes of discussion we shall assume the threshold potential of the liquid crystal material 14 utilized in this embodiment is three volts and that conducting strip 31 is maintained at "ground" potential (zero volts with respect to all other points in liquid crystal device 10). The analog signal to be displayed is applied to conducting strip 24. As the potential applied to conducting strip 24 exceeds the threshold potential of three volts, segment 22J will turn "on" ("on" shall for convenience merely be taken to designate an optical state opposite that of the remaining, unenergized segments 22). As the potential applied to conducting strip 24 increases further, while segment 22J remains on segments 22I to 22A will sequentially turn, and remain, on. Thus, segments 22 will turn on from right to left in a fashion similar to that of a thermometer in which the liquid encapsulated therein continually rises with temperature.

Resistor 33 is necessary to provide a sufficient potential difference between segment 22A and conducting back plate 26 so that segment 22A may turn on. Where desired, resistor 33 may additionally function as a "loading" resistor, absorbing any possible transient voltage spikes that may occur in the analog input signal.

Since the total resistance to any particular segment 22 increases as one proceeds from segment 22J through the resistor network toward segment 22A, in order to insure that an equal and linear voltage drop (preferably equal to the threshold potential) occurs across each segment, the incremental resistance between each segment must proportionally decrease as one proceeds nearer to segment 22A. Thus, a non-linear, analog input signal can be directly displayed by a linearly expanding "null segment" through the proper selection of the resistance ratio between resistors 25 so as to offset the non-linearity in the analog input signal.

Inasmuch as the present invention is subject to many variations, modifications and changes in detail, a number of which have been expressly stated herein, it is intended that all matter described throughout this entire specification or shown in the eaccompanying drawings be interpreted as illustrative and not in a limiting sense. It should thus be evident that a device constructed according to the concept of the present invention, and reasonably equivalent thereto, will accomplish the objects of the present invention and otherwise substantially improve the art of displaying analog information in liquid crystal devices.

What is claimed is:

1. A liquid crystal device for the display of analog information in images and patterns and whose operational power is furnished by a signal containing the analog information, comprising:
   a front and a back transparent plate,
   a layer of liquid crystal material sandwiched between said front and back transparent plates,
   transparent conducting means applied to selected portions of the side of both said front and back transparent plates adjacent said liquid crystal material including at least two physically separate, distinct segments applied to one said transparent plate and at least one conducting plate applied to the opposite said transparent plate,
   means for having a voltage gradient impressed transversely across said transparent plate on which said distinct segments are applied including a resistor network formed out of the same material utilized to form said distinct segments and located on said transparent plate on which said distinct segments are applied, said resistor network having at least one physically separate, distinct resistor interposed between each said distinct segment such that said liquid crystal device has only two terminals, and
   resistor means formed out of the same material utilized to form said distinct segments and connected between one end of said resistor network and said conducting plate,
   the signal containing the analog information connected to said two terminals, such that the operational power of the device is furnished by the signal containing the analog information.

2. A liquid crystal device, as defined in claim 1, wherein said liquid crystal material has a twisted nematic structure and primarily field-effect electrooptic properties and further including means for polarizing light passing through said transparent plates and said layer of liquid crystal material.

3. A liquid crystal device, as defined in claim 2, further comprising means adjacent one of said transparent plates for reflecting polarized light which has passed through said layer of liquid crystal material back through said layer of liquid crystal material without depolarizing said light.

4. A liquid crystal device, as defined in claim 3, wherein said transparent conducting means is selected from the group consisting of indium oxide and tin oxide.

5. A liquid crystal device, as defined in claim 1, further comprising means adjacent one of said transparent plates for reflecting polarized light which has passed through said layer of liquid crystal material back through said layer of liquid crystal material without depolarizing said light.

6. A liquid crystal device, as defined in claim 5, wherein said transparent conducting means is selected from the group consisting of indium oxide and tin oxide.

7. A liquid crystal device, as defined in claim 1, wherein said segments are generally rectangular in shape.

8. A liquid crystal device, as defined in claim 7, wherein said resistor network is linear.

9. A liquid crystal device, as defined in claim 7, wherein said resistor network is non-linear.

* * * * *